United States Patent [19]

Broussely et al.

[11] Patent Number: 4,546,057
[45] Date of Patent: Oct. 8, 1985

[54] POSITIVE ACTIVE MATERIAL FOR ELECTROCHEMICAL CELLS AND ELECTROCHEMICAL CELLS USING SAID MATERIAL

[75] Inventors: Michel Broussely, Liguge; André Lecerf, Pace, both of France

[73] Assignee: Saft, S.A., Romainville, France

[21] Appl. No.: 635,824

[22] Filed: Jul. 30, 1984

[30] Foreign Application Priority Data

Aug. 3, 1983 [FR] France ................... 83 12809

[51] Int. Cl.$^4$ .............................................. H01M 6/14
[52] U.S. Cl. ..................................... 429/218; 429/191; 429/197
[58] Field of Search ............... 429/218, 194, 197, 191, 429/209, 232

[56] References Cited

U.S. PATENT DOCUMENTS

| | | | |
|---|---|---|---|
| 4,015,055 | 3/1977 | Langan et al. | 429/219 X |
| 4,085,259 | 4/1978 | Lauck | 429/218 X |
| 4,158,723 | 6/1979 | Gabano | 429/197 |
| 4,268,588 | 5/1981 | Lecerf et al. | 429/194 |
| 4,298,665 | 11/1981 | Evans et al. | 429/218 X |
| 4,301,220 | 11/1981 | Evans et al. | 429/218 X |
| 4,362,793 | 12/1982 | Bittihn et al. | 429/191 |

*Primary Examiner*—Anthony Skapars
*Attorney, Agent, or Firm*—Kenyon & Kenyon

[57] ABSTRACT

Positive active material (2) for electrochemical cells, characterized by the fact that it is constituted by an anhydrous borate having the formula $Bi_4B_2O_9$. The invention is applicable to cells using lithium as the negative active material and the electrolyte may be solid or liquid.

7 Claims, 5 Drawing Figures

POSITIVE ACTIVE MATERIAL FOR ELECTROCHEMICAL CELLS AND ELECTROCHEMICAL CELLS USING SAID MATERIAL

The present invention relates to a positive active material for electrochemical cells, and in particular for high specific energy cells with a negative electrode based on an alkali metal or an alkali metal alloy. The invention also relates to electrochemical cells applying this positive active material.

BACKGROUND OF THE INVENTION

The problem is to obtain electrochemical cells having good storage characteristics, with a discharge voltage around 1.5 volts, and which have a long discharge plateau at this level.

The intended applications are in particular supplying power to electronic watches.

In this field, cells using the zinc/silver oxide couple do not have sufficient storage characteristics. However, cells using an alkali metal such as lithium as the negative active material do meet these requirements.

Preferred implementations of the invention thus provide a cell of this type (eg. for electronic watches) and having a discharge plateau which is an improvement over known cells.

SUMMARY OF THE INVENTION

The present invention provides a positive active material for electrochemical cells constituted by an anhydrous borate of bismuth having the formula $Bi_4B_2O_9$.

The invention also provides cells including such positive active material and an alkali metal or an alkali metal alloy as negative active material.

A first implementation of such a cell has a non-aqueous electrolyte which is liquid at ordinary temperatures and pressures.

The electrolyte solvents may be esters such as ethylene or propylene carbonate, or cyclic ethers such as dioxolane or tetrahydrofuran, or straight chain ethers such as dimethyl ethers and in particular dimethoxyethane, or mixtures thereof. The solute is preferably lithium perchlorate, but may also be lithium trifluoromethane sulfonate, lithium tetrafluoroborate or lithium hexafluoroarsenate, inter alia.

A second implementation of a cell in accordance with the invention includes a solid electrolyte.

Any currently known material may be used, whether it is a crystalized compound such as lithium iodide optionally dispersed on alumina, or a conductive organic polymer such as ethylene polyoxide containing a lithium salt, or a vitreous material based on sulfides or on oxides.

BRIEF DESCRIPTION OF THE DRAWINGS

Examples of the invention are described with reference to the accompanying drawings, in which.

MORE DETAILED DESCRIPTION

Figure 1:
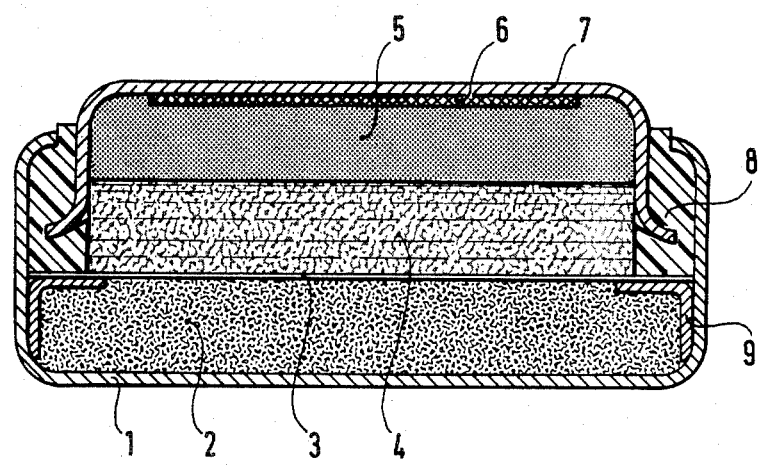
FIG. 1 is a diagrammatic section through a first cell in accordance with the invention and having a liquid electrolyte.

Cells in accordance with the invention were implemented in the form of liquid organic electrolyte button cells as shown diagrammatically in FIG. 1.

In this figure, reference 1 designates a stainless steel cup which contains the positive active mass 2 held in place by a metal ring 9. A negative cup 7, likewise of stainless steel contains the negative active material 5 which is lithium encrusted on a nickel support grating 6 which is welded to the cup 7. The active materials are separated by a "barrier" separator 3 made of polypropylene and by a porous cellulose separator 4 soaked in electrolyte. A polypropylene sealing ring 8 isolates the two cups and seals the cell.

The positive active material in accordance with the invention, anhydrous bismuth borate $Bi_4B_2O_9$ was prepared using a known method described by Levin and McDaniel in the "Journal of the American Ceramic Society" 45, 8, p.355 (1962). It consists in heating a stoichiometric mixture of bismuth oxide $Bi_2O_3$ and boron oxide $B_2O_3$ to a temperature of 670° C.

In a typical experiment, 7.47 grams (g) of $B_2O_3$ were added to 100 g of $Bi_2O_3$. The mixture was placed in a ball crusher for half an hour. The mixture was then poured into a silico-aluminous crucible and slightly compacted. The crucible was then raised to a 670° C. for two hours in an oven and in air. The resulting product having the formula $Bi_4B_2O_9$ is crushed to the desired grain size. The density of the product obtained was measured and found to be equal to 8.14 g/cm$^3$, the specific capacity of the material being 2.60 Ah/cm$^3$.

To make the active mass 2, anhydrous bismuth borate was prepared as described above, and the borate was mixed at 70% by weight with 30% by weight lead powder. 300 mg of the mixture were compressed into the positive cup 1 to form the positive electrode.

The anode is constituted by a 16 mg disk of lithium.

The electrolyte used by this cell is a 2 moles/liter solution of lithium perchlorate in dioxolane.

The cells made are 11.6 mm in diameter and 2.1 mm in height.

The cells1 thus constituted were discharged through a resistance of 15 kΩ. The average discharge curve obtained is shown at A in FIG. 2, where the discharge period t in hours is plotted along the X-axis and the tension V in volts is plotted along the Y-axis.

As can be seen, the discharge voltage lies in the range 1.8 V to 1.2 V. The capacity obtained, ie. 60 mAh, represents a yield of 97% which is better than that generally obtained from zinc/silver oxide cells of this size.

Figure 2:
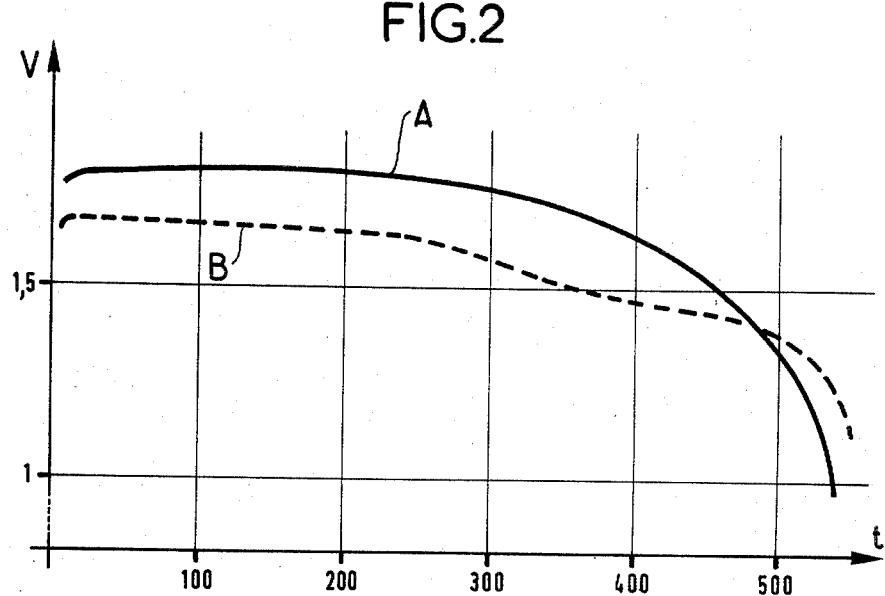
FIG. 2 is a graph showing the average discharge curve of the FIG. 1 cell through 15 kΩ, together with the discharge curve of a prior art cell.

Also in FIG. 2, curve B shows the discharge curve of a lithium cell of the same size using a mixed lead and bismuth oxide $Bi_2Pb_2O_5$ in accordance with French Pat. No. 77 30946 (published under U.S. Pat. No. 2,406,312) as active cathode material.

The improvement in plateau voltage obtained by using the above-described new material can thus be seen.

Figure 3:
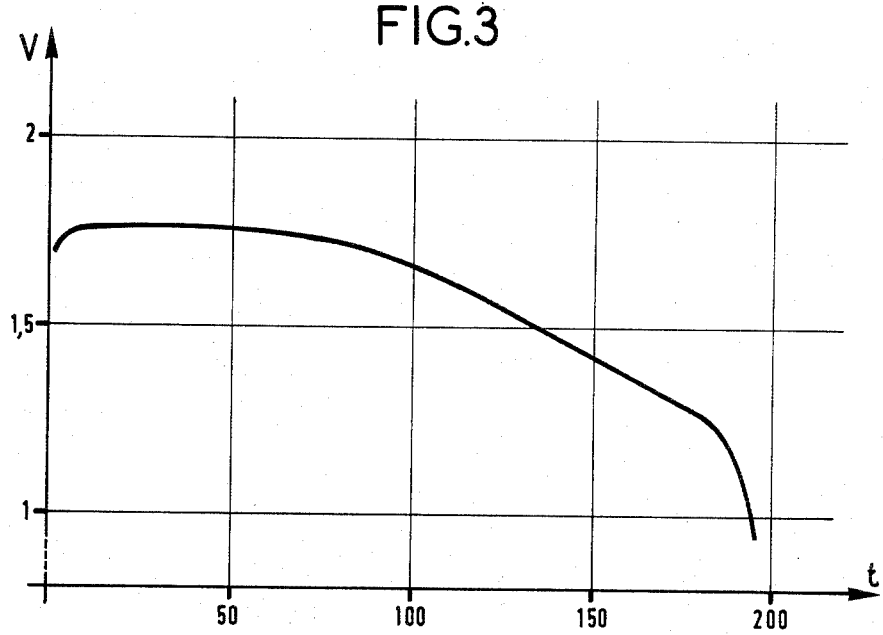
FIG. 3 is a graph showing the average discharge curve through 5 kΩ of a cell in accordance with the invention and identical to the FIG. 2 cell.

Further, this capacity may be restored in a more severe regime as shown in FIG. 3 which shows the discharge curve through a resistance of 5 kΩ.

Figure 4:
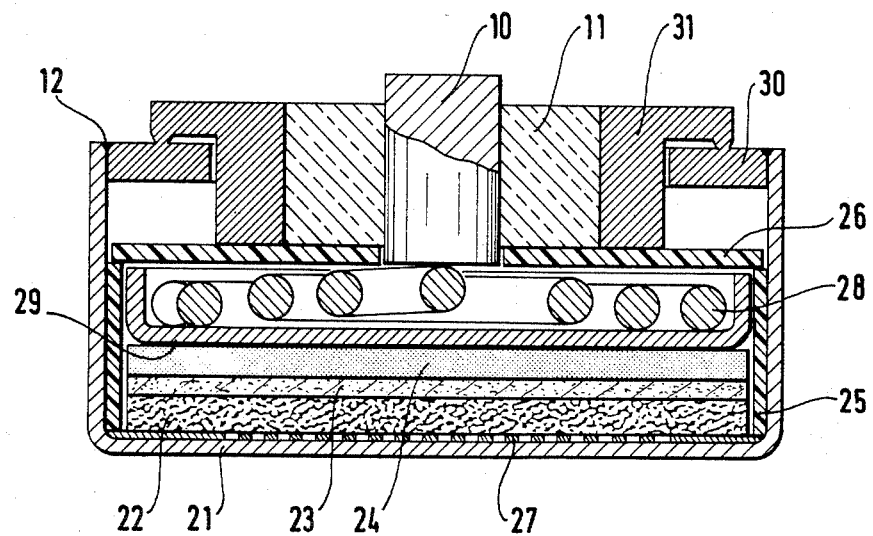
FIG. 4 is a diagrammatic section through a second cell in accordance with the invention and having a solid electrolyte.

According to another variant in accordance with the invention, cells were made with a solid electrolyte having the formula 0.18 $P_2S_2$, 0.37 $Li_2S$, 0.45 LiI as described in French Pat. Nos. 81 11902 and 81 11903 (published under U.S. Pat. Nos. 2,508,239 and 2,508,240). The cells were made as shown in FIG. 4.

The cathode mass 22 is made from a mixture of 65% by weight $Bi_4B_2O_9$, 30% by weight electrolyte, and 5% by weight graphite. 150 mg of mixture were compressed to 2.5 $T/cm^2$ in a cylindrical mold of 10.7 mm diameter to obtain a pellet. 150 mg of electrolyte 23 were compressed in the same manner. A 10.5 mg pellet of lithium 24 was stuck to the electrolyte layer.

The assembly was placed in a stainless steel cup 21 containing an insulating ring 25 of polypropylene, an insulating washer 26 of PTFE, and a collector grid 27 of stainless steel. The electrodes are kept pressed against each other by a spring 28. The pressure exerted by the spring passes through a stainless steel cup 29. The positive cup 21 is closed by a cover 30 and by a part 31. The spring 28 and cup 29 assembly constitutes the anode collector and is welded or soldered to a metal negative pole 10. The negative pole is insulated from the positive cup by a glass seal 11. The cell is sealed by laser welding a metal on metal join 12.

Figure 5:
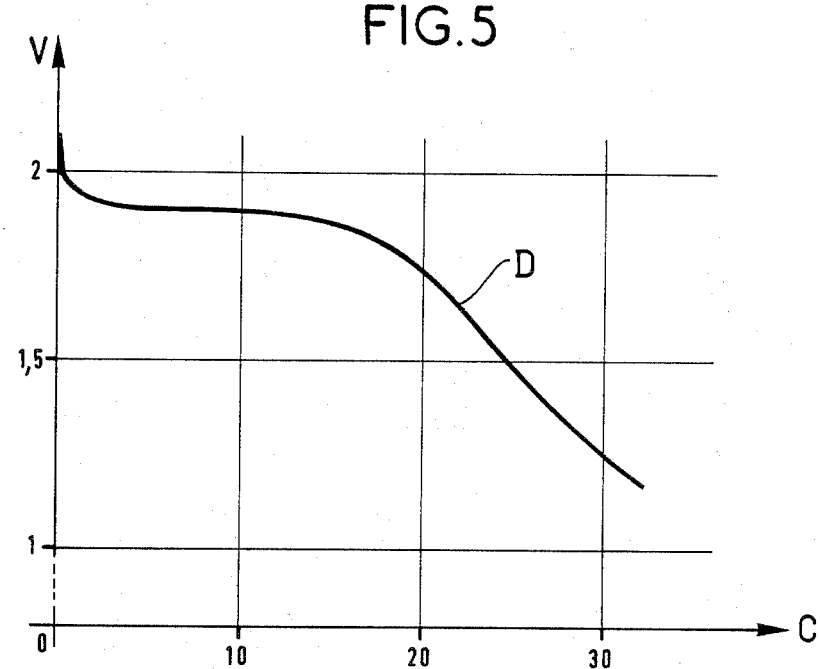
FIG. 5 is a graph showing the average discharge curve of the FIG. 4 cell through 15 kΩ and at 110° C.

A cell as described above was discharged at 110° C. through 15 k$\Omega$. The discharge resulting discharge curve D is shown in FIG. 5 (with capacity in mAh plotted along the X-axis and tension U in volts along the Y-axis). It will be observed on this figure that the calculated faradic cathode capacity of the cell, 32 mAh, was actually obtained at more than 1 volt.

Naturally, the cells in the above examples are test cells and their implementation could be improved, in particular by seeking a better balance between the quantities of anode and cathode materials used.

We claim:

1. An electrochemical cell having a positive active material constituted by an anhydrous borate having the formula $Bi_4B_2O_9$, and having a negative electrode in the form of an alkali metal or an alkali metal alloy.

2. An electrochemical cell according to claim 1, wherein the alkali metal is lithium.

3. An electrochemical cell according to claim 1, having a solid electrolyte.

4. An electrochemical cell according to claim 1, having an electrolyte which is a liquid solution at ambient temperature and which has an aprotic compound as a solvent.

5. An electrochemical cell according to claim 4, wherein the solvent is chosen from the group constituted by the esters and cyclic and straight chain ethers, and mixtures thereof.

6. An electrochemical cell according to claim 5, wherein the esters are propylene and ethylene carbonate, the cyclic ethers are tetrahydrofuran and dioxolane, and the straight line ethers are 1.2 dimethoxyethane and other dimethyl ethers.

7. An electrochemical cell according to claim 4, wherein the electrolyte solute is chosen from the group constituted by lithium perchlorate, lithium tetrafluoroborate, lithium trifluoromethane sulfonate, and lithium hexafluoro-arsenate.

* * * * *

UNITED STATES PATENT AND TRADEMARK OFFICE
CERTIFICATE OF CORRECTION

PATENT NO. : 4,546,057
DATED : 8 October 1985
INVENTOR(S) : Michel Broussely et al.

It is certified that error appears in the above-identified patent and that said Letters Patent is hereby corrected as shown below:

Column 2, line 32: before "670°C" insert --temperature of--.

Column 2, line 48: change "cellsl" to --cells--.

Column 3, line 27: change "The discharge resulting" to --The resulting--.

Column 3, line 31: eliminate the bold face in "32 mAh".

Signed and Sealed this

Sixth Day of May 1986

[SEAL]

Attest:

DONALD J. QUIGG

Attesting Officer

Commissioner of Patents and Trademarks